United States Patent [19]

Kaji et al.

[11] Patent Number: 5,539,270
[45] Date of Patent: Jul. 23, 1996

[54] ACCELERATION DETECTOR

[75] Inventors: Norimasa Kaji, Ibaraki; Hideki Fukozono, Nara; Hiroyuki Takami, Hirakata; Hiromi Nishimura, Takatsuki; Hidetoshi Takeyama, Hisai; Hirohisa Tanaka, Tsu; Masahiro Kodo, Mic, all of Japan

[73] Assignee: Matsushita Electric Works, Ltd., Osaka, Japan

[21] Appl. No.: 342,023

[22] Filed: Nov. 16, 1994

[30] Foreign Application Priority Data

Nov. 19, 1993 [JP] Japan .................................. 5-290616
Feb. 14, 1994 [JP] Japan .................................. 6-017086
Aug. 22, 1994 [JP] Japan .................................. 6-196770

[51] Int. Cl.⁶ .............................................. H01L 41/08
[52] U.S. Cl. ........................ 310/329; 310/332; 310/348
[58] Field of Search ........................ 310/329, 330–332, 310/339, 340, 344, 348; 73/35, 654

[56] References Cited

U.S. PATENT DOCUMENTS

| | | | |
|---|---|---|---|
| 3,486,047 | 12/1969 | Seney | 310/329 X |
| 4,333,029 | 6/1982 | Kolm et al. | 310/329 |
| 4,755,706 | 7/1988 | Harnden, Jr. et al. | 310/332 |
| 5,008,582 | 4/1991 | Tanuma et al. | 310/332 |
| 5,235,237 | 8/1993 | Leonhardt | 310/329 |
| 5,319,153 | 6/1994 | Fishman | 310/340 X |
| 5,373,213 | 12/1994 | Smith | 310/348 X |

*Primary Examiner*—Mark O. Budd
*Attorney, Agent, or Firm*—Nikaido Marmelstein Murray & Oram

[57] ABSTRACT

The acceleration applied to a selected device such as a magnetic disc drive system can be detected by the use of an acceleration detector having at least one piezoelectric acceleration sensor unit. The sensor unit includes a piezoelectric element, a supporting member for the piezoelectric element and two electrical leads. The piezoelectric element is formed with a pair of elongate sheets made of a piezoelectric ceramic and an intermediate insulation layer interposed between the elongate sheets to generate a voltage difference instantaneously therebetween in response to the acceleration of the acceleration detector. The support member is made of an electrically insulating resin, and has a concave which is formed with side and bottom walls and a top opening. The side wall is provided with a slit in which the piezoelectric element is tightly caught in such a manner as to divide the concave into two open-chambers and be supported by the support member in a cantilever fashion. The electrical leads extend into the concave to make electrical connections between the elongate sheets and the electrical leads. In the present invention, since the piezoelectric element can be attached accurately at a predetermined direction to the supporting member by forcing it into the slit, it is possible to stably supply the acceleration detector having excellent sensitivity to the acceleration without causing variations in detecting direction of the acceleration.

15 Claims, 12 Drawing Sheets

ACCELERATION DETECTOR

BACKGROUND OF THE INVENTION

1. Field of the Invention

The present invention relates to an acceleration detector using a piezoelectric element, which is adapted to be mounted to a selected device and capable of generating an electrical output signal when it is subjected to vibrations or shock.

2. Disclosure of the Prior Art

Figure 17:
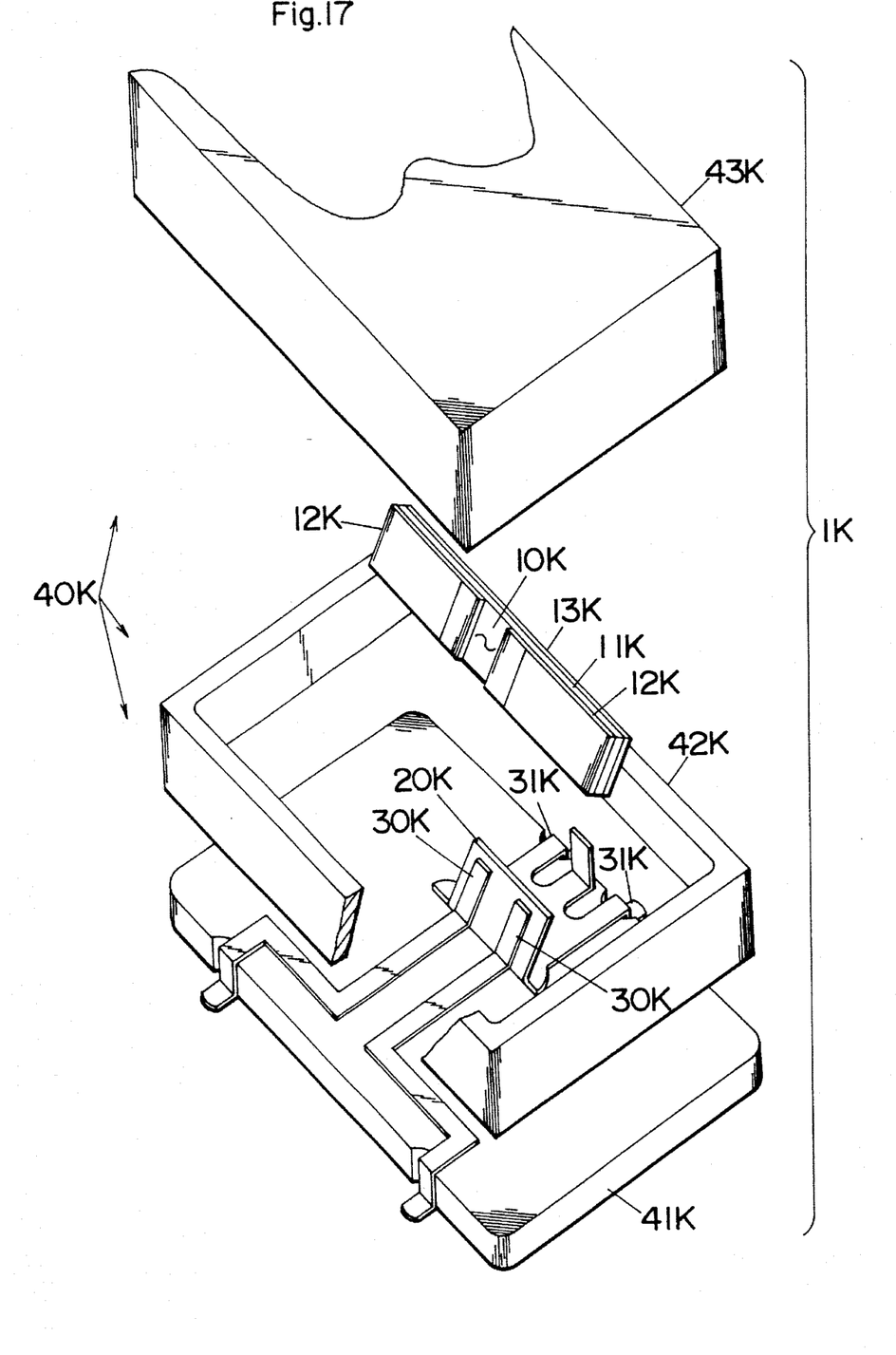
FIG. 17 is an exploded perspective view a shock sensor of the prior art.

Magnetic disc drive systems have been widely used as an external memory device of a computer. When a magnetic disc drive system is subjected to vibrations or shock, it is necessary to detect the acceleration of the disc drive system and to protect the magnetic disc rotated at high speed by stopping the operations of read/write heads in response to the detected acceleration. U.S. Pat. No. 5,235,472 proposes a shock sensor 1K mounted on a computer disc drive. As shown in FIG. 17, the shock sensor 1K is provided with a subassembly 10K comprised of piezoelectric polymer film 11K disposed between top metallized layers 12K and lower metallized layer 13K, and an electrically shielded case 40K for incorporating the subassembly 10K therein. The shielded case 40K is formed with a base 41K having a supporting member 20K for supporting the subassembly 10K and receiving first and second electrical leads 30K and 31K, a rectangular-shaped frame 42K providing structural integrity of the shock sensor 1K, and a metallic cover 43K providing side and top electrical shielding. The subassembly 10K is mounted to the supporting member 20K such that the top metallized layers 12K are connected to the first electrical leads 30K, and the lower metallized layer is connected to the second electrical lead 31K. The top and lower metallized layers (12K and 13K) are connected to amplification and comparator circuitry (not shown) through the first and second electrical leads (30K and 31K). The amplification and comparator circuitry issues a write fault signal upon detection of external force in excess of a predetermined threshold. This prior art also describes that the shock sensor 1K may be mounted on the computer disk drive in such a manner as to be a 45 degree(s) angle to each of the x, y and z axes of an orthogonal coordinate system so that linear and torsional forces imposed thereto may be monitored.

For operating the shock sensor 1K stably for an extended time, it is necessary to securely attach the subassembly 10K to the supporting member 20K of the base 41K. However, since the shock sensor 1K of this prior art uses the piezoelectric polymer film 11K with relatively low thermal resistance, there is a problem of causing a breakage of the polymer film 11K when fixing the subassembly 10K to the supporting member 20K by soldering. In addition, since the subassembly 1K is mounted on the supporting member 20K at an inclined angle to the base 41K, care must be used to accurately fix the subassembly 10K to a predetermined position on the supporting member 20K by gluing. Such a care may create a difficulty of production of the shock sensor 1K. If the care is not used, shock sensors having undesired detecting directions of the acceleration would be produced with a considerable probability.

As to a shock sensor to be mounted on disk drive units of portable disk-top, lap-top and notebook computers, etc., it should be also noted that the need for miniaturize the shock sensor is particularly critical as well as the need for improving the reliability of the shock sensor. In the shock sensor 1K of FIG. 17, most of a space lying around the subassembly 10K in the shield case 40K is not utilized for detecting the acceleration. Therefore, it would be desired to make the shock sensor 1K as a whole smaller by reducing the above indicated useless space without sacrifice of sensitivity of the shock sensor to the vibrations or shock.

SUMMARY OF THE INVENTION

For improving the above problems, the present invention is directed to an acceleration detector having at least one piezoelectric acceleration sensor unit. The sensor unit includes a piezoelectric element, a supporting member for supporting the piezoelectric element and two electrical leads. The piezoelectric sensor is formed with a pair of elongate sheets made of a piezoelectric ceramic and an intermediate insulation layer interposed between the elongate sheets to generate a voltage difference instantaneously therebetween in response to the acceleration of the acceleration detector. This piezoelectric element is already known as a bimorph cell type piezoelectric element. The support member is made of an electrically insulating resin, and has a concave which is formed with side and bottom walls and a top opening. The side wall is provided with a slit in which the piezoelectric element is tightly caught in such a manner as to divide the concave into two open-chambers and be supported by the support member in a cantilever fashion. One ends of the electrical leads extend into the concave to make electrical connections between the elongate sheets and the electrical leads. The other ends of the electrical leads are projected outside of the support member through the side wall. In the present invention, since the piezoelectric element can be attached accurately at a predetermined direction to the supporting member by forcing it into the slit, it is possible to stably supply the acceleration detector having excellent sensitivity to the acceleration without causing variations in detecting direction of the acceleration.

Therefore, it is a primary object of the present invention to provide an acceleration detector using at least one piezoelectric element which is supported by an unique supporting member to miniaturize the acceleration detector and obtain excellent sensitivity of the acceleration detector to the acceleration.

For the practical use of the acceleration detector, it is preferred that the acceleration sensor unit is enclosed in a metallic shield case. For example, the shield case has an aperture into which the support member is forced, notches formed at the circumference of the aperture for projecting the electrical leads outside of the shield case without contacting with the shield case, and earth terminals projecting from an outer surface of the shield case to maintain the shield case at the earth level. More preferably, the shield case enclosing the sensor unit therein is coated with an insulating resin so as to provide an air-tight seal between the supporting member and the shield case, and project the electrical leads and the earth terminals from the coated resin. The acceleration detector can be accurately mounted on a predetermined position of a circuit board by soldering free ends of the earth terminals to the circuit board.

In a further preferred embodiment of the present invention, the elongate sheets of the piezoelectric element are electrically connected to the electrical leads with the use of a conductive bond. An electrically insulating bond having a stronger bonding strength than the conductive bond is filled within the concave on the conductive bond to more tightly fix one end of the piezoelectric element to the supporting member, reinforce the electrical connections, and improve the strength of the supporting member.

In case of using the conductive bond, it is preferred that a primary groove is formed in the bottom and side walls of the concave to extend over the entire length of a contact face of the piezoelectric element with the bottom and side walls along the intermediate insulation layer of the piezoelectric element. When a small amount of the conductive bond cast in the concave penetrates to a clearance between the piezoelectric element and the bottom and side walls, since the primary groove effects as a trap of the conductive bond, it is possible to prevent the occurrence of a short circuit between the elongate sheets by the conductive bond. In addition, when an auxiliary groove perpendicular to the primary groove is formed in the bottom wall to extend between the electrical leads, the connections between the electrical leads and the elongate sheets by the conductive bond can be reinforced by the insulating bond in the auxiliary groove.

In a still further preferred embodiment of the present invention, the acceleration detector is formed with two piezoelectric acceleration sensor units, which are disposed in a back to back relation so as to project the piezoelectric elements in the opposite directions to detect a rotational force applied to the acceleration detector. In this case, it is preferred that the supporting member of one of the sensor units is integrally molded with that of the other sensor unit. When the piezoelectric elements are disposed respectively at different angles to the supporting members, it is possible to detect rotational and linear forces applied to the acceleration detector.

The above and the other objects, characteristic features and advantages of the present invention will become apparent to those skilled in the art as disclosure is made in the following description of a preferred embodiment of the invention, as illustrated in the accompanying drawings.

BRIEF DESCRIPTION OF THE DRAWINGS

In FIGS. 8A to 8C.

In FIGS. 10A to 10B.

In FIGS. 11A to 11C showing a modification of the shield case of FIG. 10A.

In FIGS. 13A to 13C

DESCRIPTION OF THE PREFERRED EMBODIMENTS

<First Embodiment>

Figure 1:
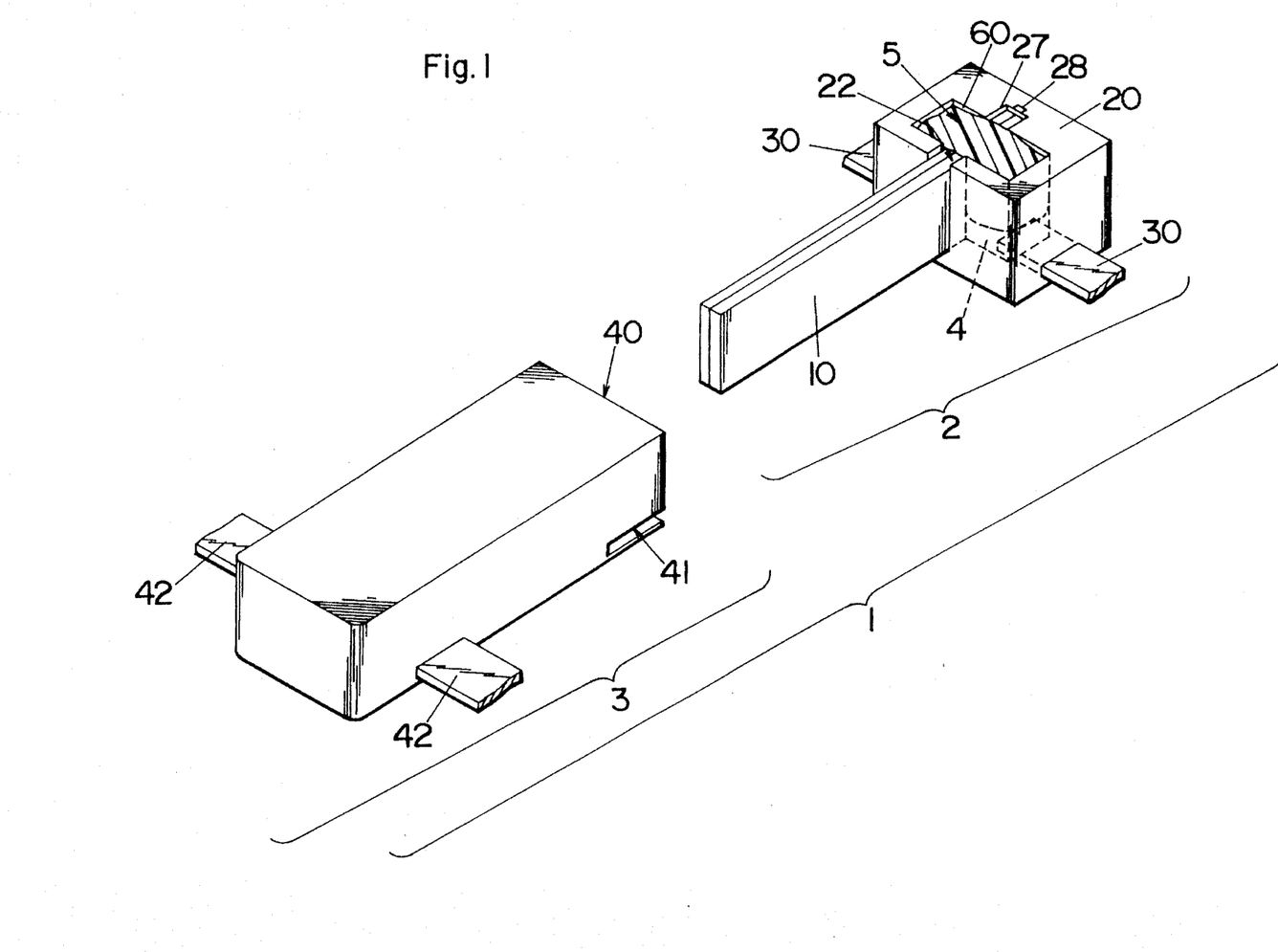
FIG. 1 is a perspective view of a piezoelectric acceleration sensor unit and metallic shield case of an acceleration detector of a first embodiment of the present invention.

Referring to the attached drawings, an acceleration detector 1 of the present invention is explained. The acceleration detector 1 comprises a piezoelectric acceleration sensor unit 2 and a metallic shield case 3. The sensor unit 2 includes a piezoelectric element 10, a supporting member 20 for supporting the piezoelectric element 10 and two electrical leads 30, as shown in FIG. 1.

Figure 2A:
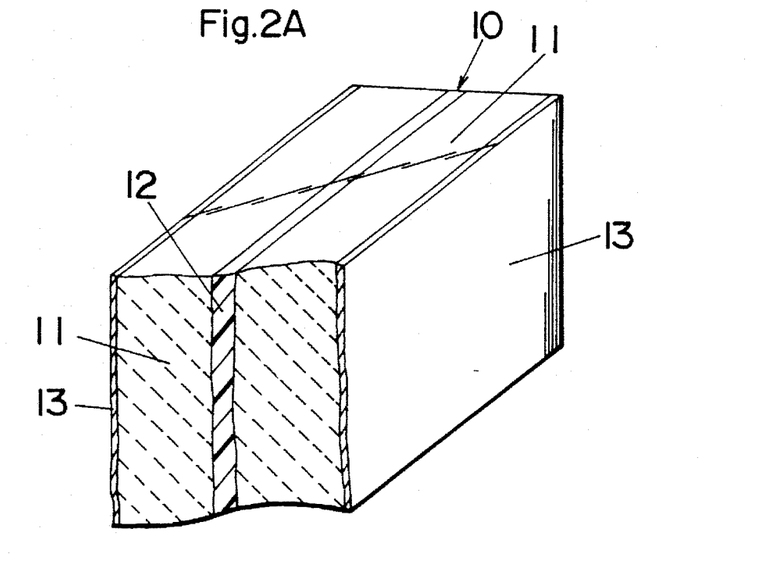
FIGS. 2A and 2B are a perspective view (partially cross-sectioned) of a piezoelectric element and a perspective view of a supporting member of the first embodiment, respectively.
Figure 3:
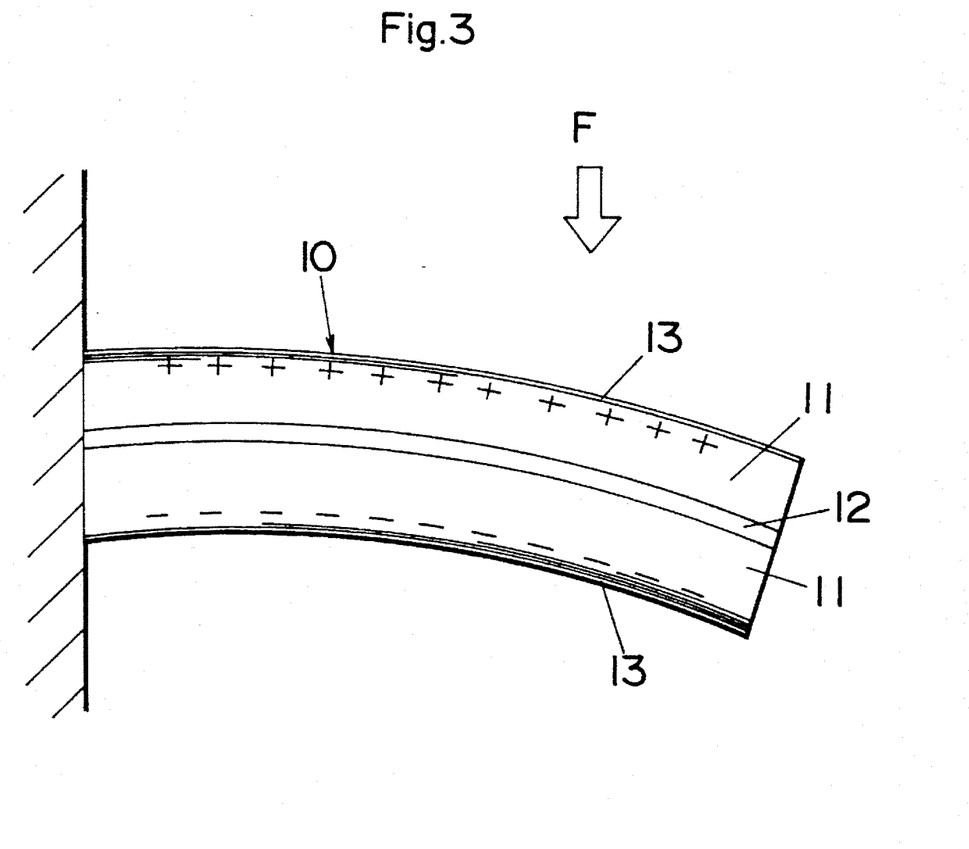
FIG. 3 explains a voltage difference generated in the piezoelectric element when the acceleration F is applied thereto; In FIGS. 4A to 4C.

The piezoelectric element 10 used in the present invention is already known as a bimorph-type piezoelectric element. That is, the piezoelectric element 10 is formed with a pair of rectangular sheets 11 made of a piezoelectric ceramic and an intermediate insulation layer 12 interposed between the rectangular sheets 11, as shown in FIG. 2A. An insulating bond for cementing the rectangular sheets together can be used as the insulation layer 12. A pair of acceleration detecting faces are defined on the rectangular sheets 11 at the opposed surfaces of the piezoelectric element 10. The acceleration detecting surfaces are coated with an electrically conductive metal such as nickel or silver to form electrodes 13 thereon. For example, as shown in FIG. 3, when the acceleration F is applied to the piezoelectric element 10 in a direction perpendicular to the detecting face to cause a deflection of the piezoelectric element 10, one of the rectangular sheets 11 is positively charged, and the other one is negatively charged. Therefore, a voltage difference is generated instantaneously between the rectangular sheets 11 in response to the acceleration of the acceleration detector 1. The acceleration of the acceleration detector 1 can be determined in accordance with the voltage difference.

Figure 2B:
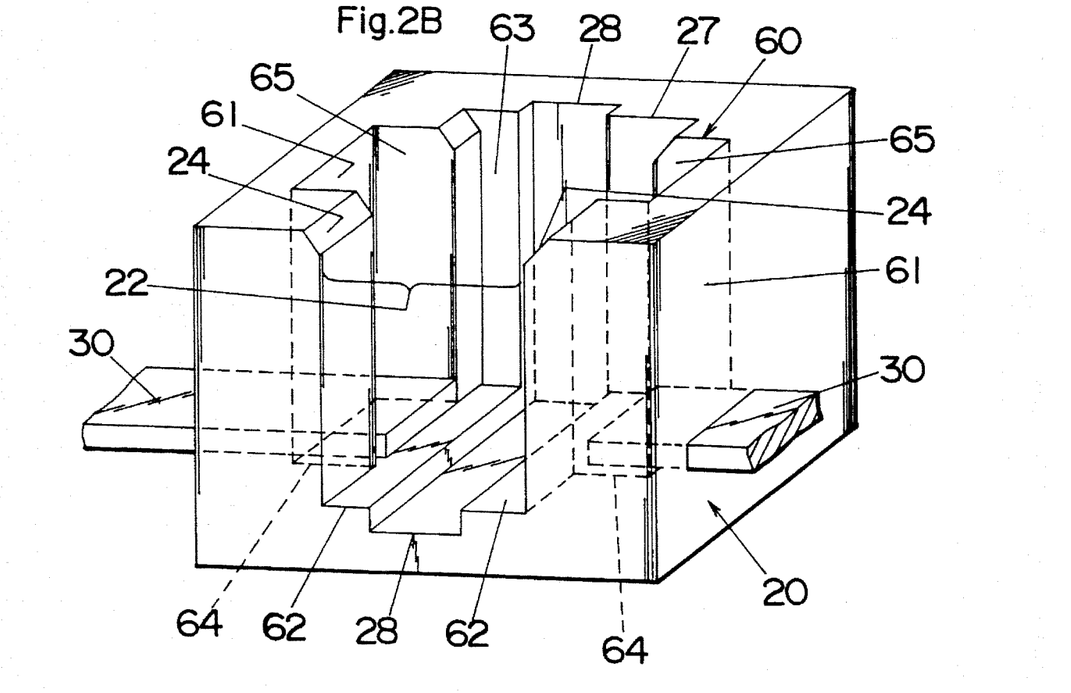

The supporting member 20 is made of an electrically insulating resin, and has a rectangular concave 60 formed with a pair of side walls 61, bottom wall 62, top opening 63, front and rear walls (64 and 65), as shown in FIG. 2B. The front wall 64 is provided with a slit 22 in which the piezoelectric element 10 is tightly caught in such a manner as to divide the rectangular concave 60 into two open-chambers and be supported by the support member 20 in a cantilever fashion, as shown in FIG. 1. For readily forcing the piezoelectric element 10 into the slit 22, it is preferred that chamfered portions 24 are formed at corners of the front wall 64. Though the piezoelectric element 10 is disposed at a right angle to the supporting member 20 in this embodiment, it is possible to dispose the piezoelectric element at an inclined angle to the supporting member 20, if necessary. A slot 27 is formed in the rear wall 65 opposed to the slit 22 to fit one end of the piezoelectric element 10 thereto. The electrical leads 30 are integrally molded with the supporting member 20 such that one ends of the electrical leads 30 extend into the rectangular concave 60, and the other ends of the electrical leads 30 are projected outside of the support member 20 through the side walls 61 in two directions perpendicular to the acceleration detecting faces of the piezoelectric element 10. The electrodes 13 of the piezoelectric element 10 are electrically connected to the electrical leads 30 with the use of a conductive bond 4 such as a silver paste. When the conductive bond 4 is cast into the rectangular concave 60 to make the electrical connections, there is a probability of penetrating a small amount of the conductive bond 4 to a clearance between the piezoelectric element 10 and the bottom wall 62 or the slot 27 of the rear wall 65. However, since a groove 28, which is formed in the bottom wall 62 and the slot 27, effects as a trap of the conductive bond 4, it is possible to prevent the occurrence of a short circuit between the rectangular sheets 11 by the conductive bond 4. As shown in FIG. 2B, the groove 28 extends over the entire length of a contact face of the piezoelectric element 10 with the bottom wall 62 and the slot 27 along the intermediate insulation layer 12 of the piezoelectric element 10. In place of the conductive bond, it is possible to connect the electrodes 13 with the electrical leads 30 by the means of laser-welding. An electrically insulating bond 5 having a stronger bonding strength than the conductive bond 4 is filled within the rectangular concave 60 on the conductive bond 4 to more tightly fix one end of the piezoelectric element 10 to the supporting member 20, reinforce the electrical connections and improve the strength of the supporting member 20. Since the piezoelectric element 10 is forced into the slit 22 so as to provide a liquid-tight seal therebetween, a seepage of the insulating bond 5 from the rectangular concave 60 through the slit 22 can be stopped.

Figure 4A:
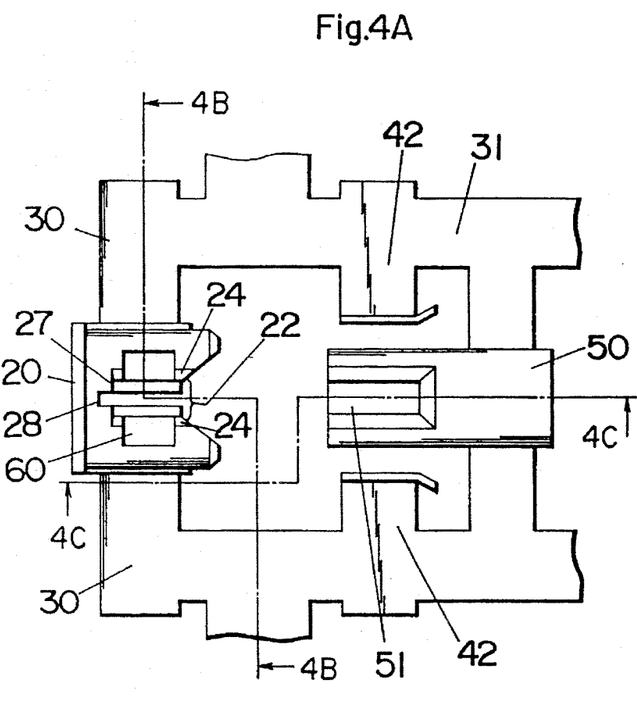
FIG. 4A is a top view of a supporting member integrally molded with a metal frame.
Figure 4B:
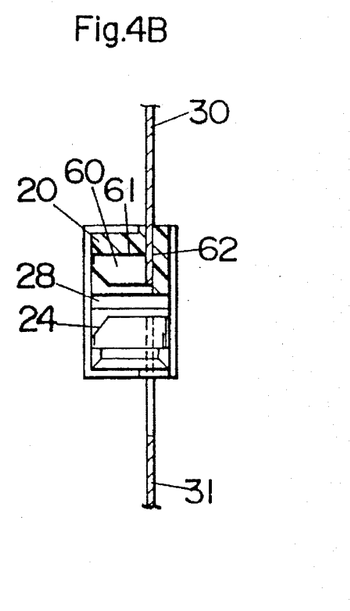
FIG. 4B is a cross-sectional view of the supporting member taken along the line I—I of FIG. 4A.
Figure 4C:
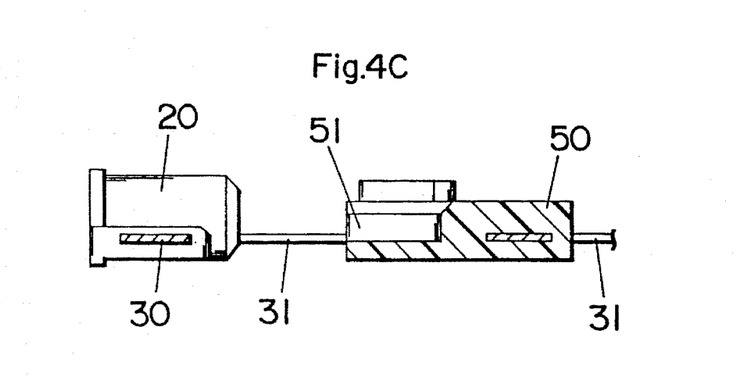
FIG. 4C is a cross-sectional view of the supporting member taken along the line II—II of FIG. 4A.
Figure 5:
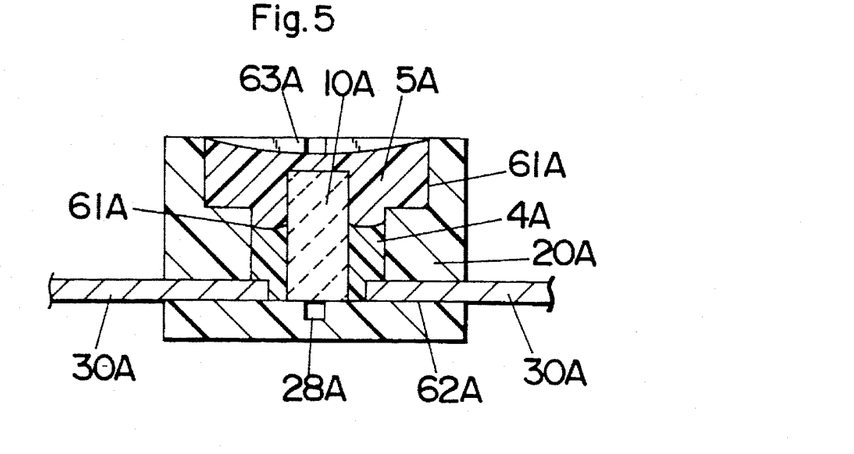
FIG. 5 shows modification of the supporting member.
Figure 6:
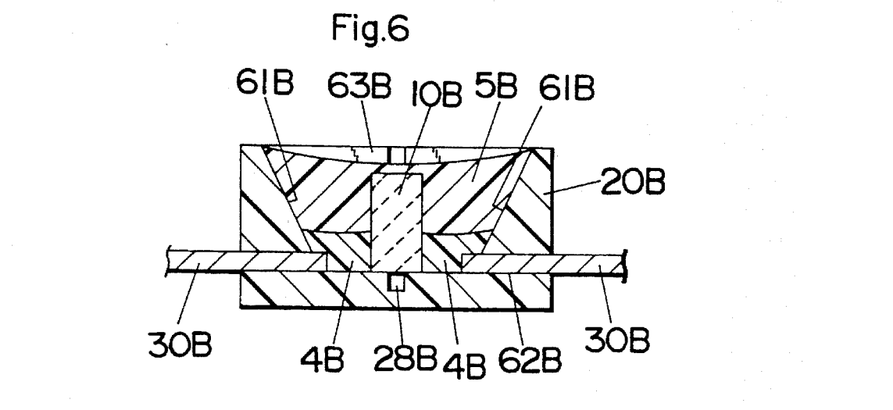
FIG. 6 shows another modification of the supporting member.
Figure 7:
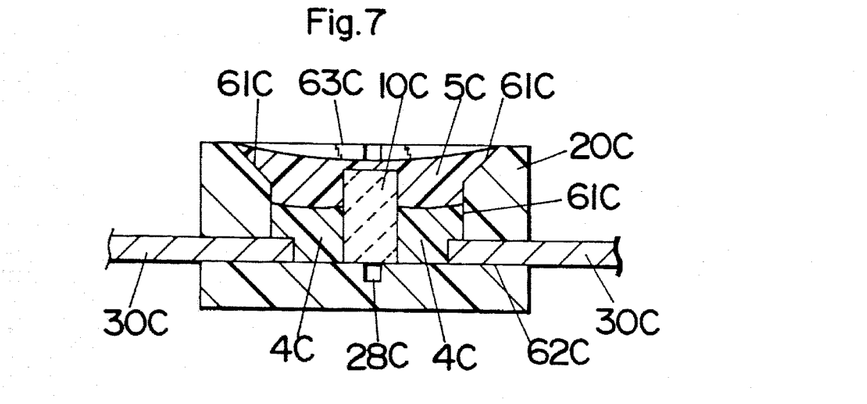
FIG. 7 shows still another modification of the supporting member.

Since the piezoelectric element 10 is sensitive to electrical noises, it is enclosed in the metallic shield case 3. The shield case 3 has a rectangular cross-section thereof and is formed with an aperture 40 into which the support member 20 is forced, a pair of notches 41 located at the circumference of the aperture 42 for projecting the electrical leads 30 outside of the shield case 3 without contacting with the shield case 3, and a pair of earth terminals 42 projecting from the shield case 3. Since the insulating bond 5 is filled within the rectangular concave 60 such that the piezoelectric element 10 is completely surrounded with the insulating bond 5 in the rectangular concave 60, as shown in FIG. 1, the piezoelectric element 10 can be insulated from the shield case 3 by the insulating bond 5 when the supporting member 20 is forced into the aperture 40 of the shield case 3. Next, a process of fabricating the acceleration detector 1 is explained in detail. As shown in FIGS. 4A to 4C, a metal frame 31 having the electrical leads 30 and earth terminals 42 extending parallel to the electrical leads 30 is produced by punching a metal plate along a predetermined pattern. The supporting member 30 is then integrally molded with the electrical leads 30. At the same time, a guide member 50 having a trench 51 is integrally molded with the metal frame 31. The trench 51 effects as a guide for accurately forcing the piezoelectric element 10 into the slit 22 of the supporting member 20. In this embodiment, the rectangular concave 60 has the side walls 61 perpendicular to the bottom wall 62. As modifications of the side walls 61, it is possible to adopt side walls 61A extending from a bottom wall 62A in such a stepwise manner that an area of the bottom wall (62A is smaller than that of a top opening 63A, as shown in FIG. 5, or side walls 61B inclined to a bottom wall 62B such that an area of the bottom wall 62B is smaller than that of a top opening 63B, as shown in FIG. 6. In addition, as shown in FIG. 7, it is preferred that each of side walls 61C is formed with a perpendicular face extending from a bottom wall 62C to an intermediate position between the bottom wall 62C and a top opening 63C and an inclined face extending from the intermediate position to the top opening 63C. Since piezoelectric acceleration sensor units of these modifications are identical in structure to that of the above embodiment except for the shapes of side walls, no duplicate explanation to common parts is deemed necessary. Like parts are designated by numerals with a suffixed letter of "A", "B" or "C". In any of these side walls, a total amount of conductive and insulating bonds to be cast into a rectangular concave can be economized.

Figure 8A:
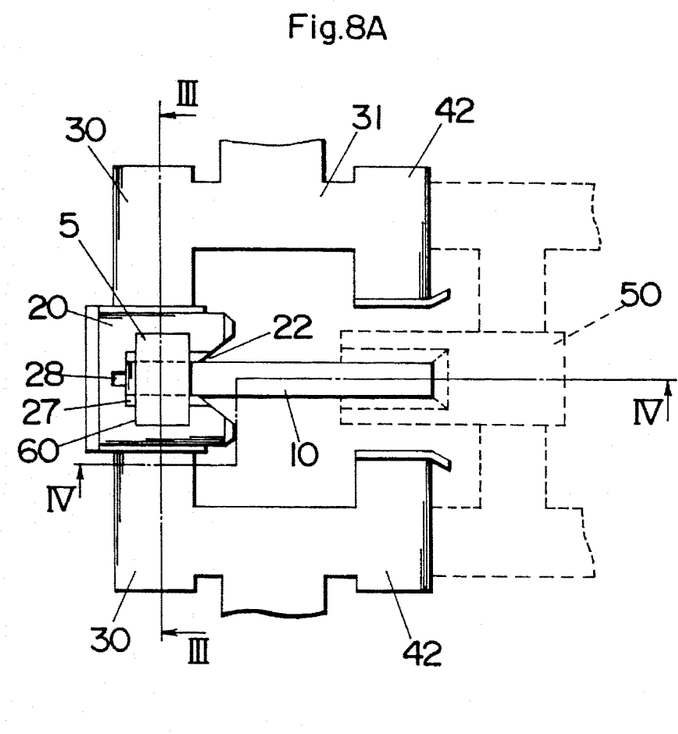
FIG. 8A is a top view of the supporting member of FIG. 4A mounting a piezoelectric element thereon.
Figure 8B:
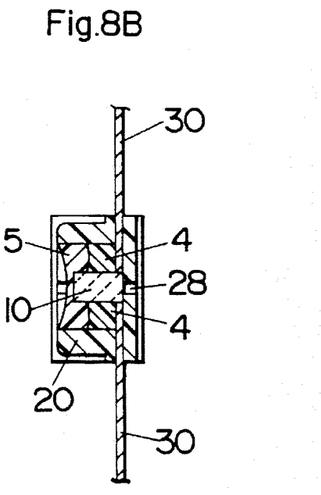
FIG. 8B is a cross-sectional view of the supporting member taken along the line III—III of FIG. 8A.
Figure 8C:
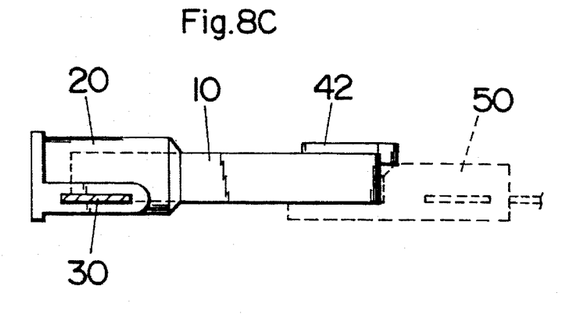
FIG. 8C is a cross-sectional view of the supporting member taken along the line IV—IV of FIG. 8A.
Figure 9:
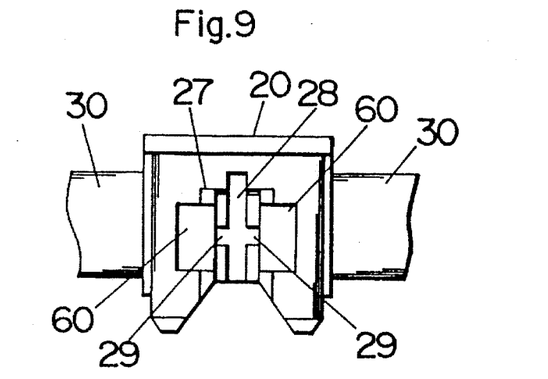
FIG. 9 is a top view illustrating an auxiliary groove of a supporting member.

As shown in FIG. 8A to 8C, since the piezoelectric element 10 is forced into the slit 22 of the supporting member 20 and the trench 51 of the guide member 50, the piezoelectric element 10 can be projected from the supporting member 20 accurately in a predetermined direction. After an optimum amount of the conductive bond 4 is cast into the rectangular concave 60 to make the electrical connections between the electrical leads 30 and the electrodes 13 of the piezoelectric element 10, and dried, the rectangular concave 60 is filled with the insulating bond 5, as shown in FIG. 8A. As described above, the groove 28 is formed as the trap of the conductive bond 4 in the bottom wall 62 and the slot 27 of the rectangular concave 60. When an auxiliary groove 29 is formed in the bottom wall 62 to extend perpendicularly to the groove 28 between the electrical leads 30, as shown in FIG. 9, the electrical connections between the electrical leads 30 and the electrodes 13 can be effectively reinforced by the insulating bond 5 in the auxiliary groove 29. After the piezoelectric element 10 is tightly fixed to the supporting member 20 in the cantilever fashion, the guide member 50 is cut away from the metal frame 31, as shown by the dotted lines of FIG. 8A.

Figure 10A:
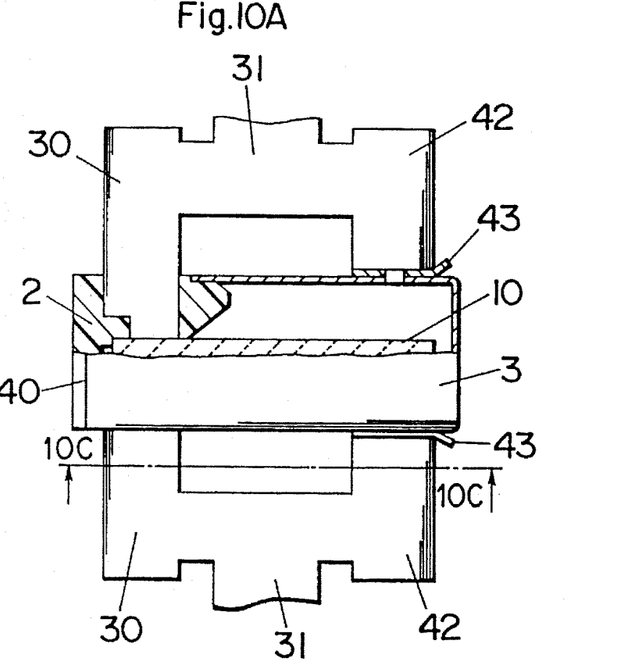
FIG. 10A is a top (partially cross-sectioned) view of a metallic shield case enclosing the supporting member and piezoelectric element therein.
Figure 10B:
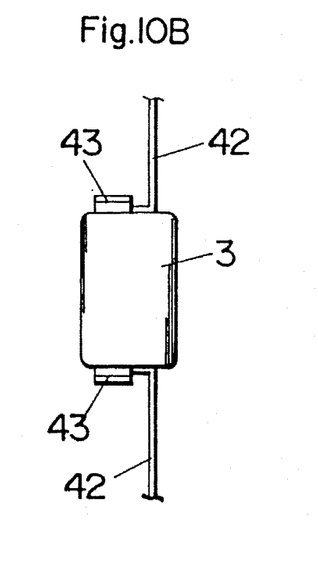
FIG. 10B is an end view of the shield case of FIG. 10A.
Figure 10C:
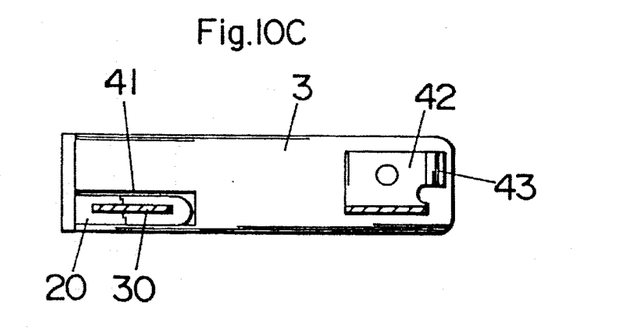
FIG. 10C is a cross-sectional view of the shield case taken along the line V—V of FIG. 10A.
Figure 11A:
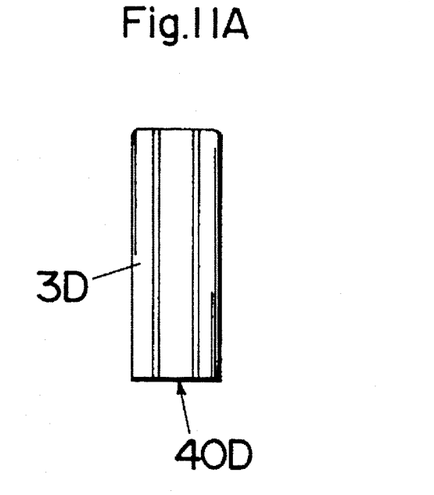
FIG. 11A is a top view.
Figure 11B:
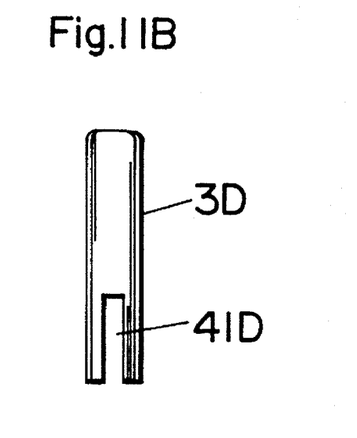
FIG. 11B is a side view.
Figure 11C:
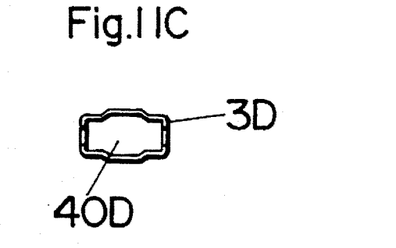
FIG. 11C is an end view.
Figure 12:
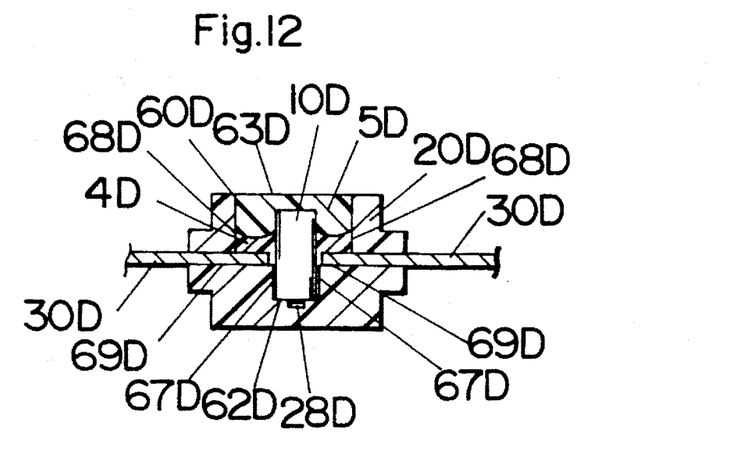
FIG. 12 is a cross-sectional view of a supporting member for the shield case of FIG. 11A.

As shown in FIG. 10A to 10C, the acceleration sensor unit 2 is enclosed in the shield case 3 by forcing the supporting member 20 into the aperture 40 of the shield case 3. The earth terminals 42 are connected to the shield case 3 by laser-welding. The electrical leads 30 are projected outside of the shield case 3 through the notches 41 without contacting with the shield case 3. In FIG. 10A, the numeral "43" designates guide portions of the earth terminals 42 which are useful for leading the shield case 3 between the earth terminals 42 extending from the metal frame 31. As a modification of the shield case 3, it is preferred to use a metallic shield case 3D having a substantially cross-shaped aperture 40D, as shown in FIGS. 11A to 11C. A supporting member 20D to be forced into the cross-shaped aperture 40D is shown in FIG. 12. A concave 60D of the supporting member 20D has a bottom wall 62D with a groove 28D, a top opening 63D, intermediate horizontal walls 69D mounting electrical leads 30D thereon, first side walls 67D extending from the bottom wall 62D to the horizontal walls 69D, and second side walls 68D extending from the horizontal walls 69D to the top opening 63D. A piezoelectric element 10D can be stably supported within a space surrounding with the bottom wall 62D and the first side walls 67D, as shown in FIG. 12. Since a piezoelectric acceleration sensor unit of this modification is identical in structure to that of this embodiment except for the above explained features, no duplicate explanation to common parts is deemed necessary. Like parts are designated by numerals with a suffixed letter of "D".

Figure 13A:
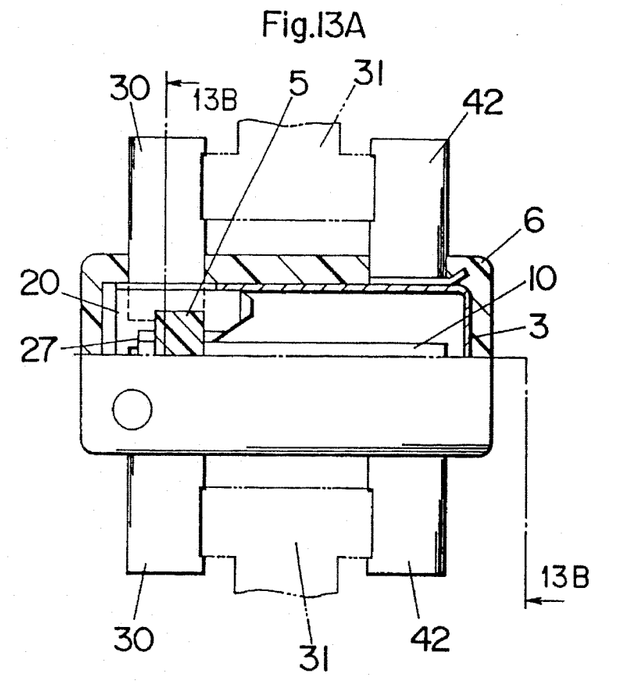
FIG. 13A is a top (partially cross-sectioned) view of the shield case of FIG. 10A molded in an insulating resin.
Figure 13B:
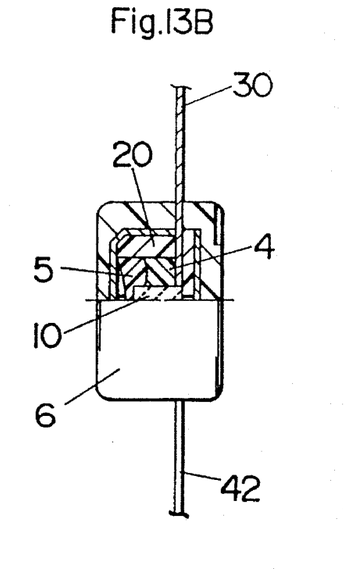
FIG. 13B is a cross-sectional view of the shield case taken along the line VI—VI of FIG. 13A.
Figure 13C:
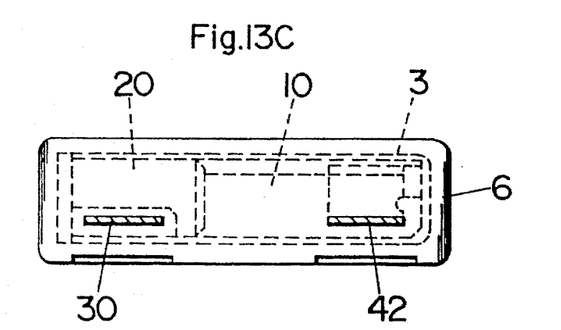
FIG. 13C is a side view of the shield case of FIG. 13A.
Figure 14A:
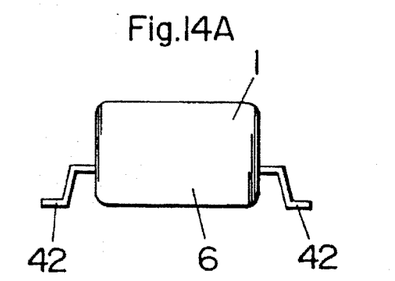
FIGS. 14A and 14B illustrate preferred shapes of earth terminals, respectively.
Figure 14B:
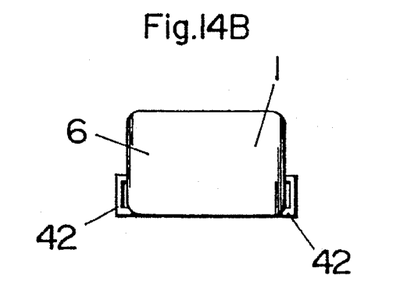

As shown in FIG. 13A to 13C, it is preferred that the shield case 3 enclosing the sensor unit 2 therein is molded with an insulating resin 6 so as to provide an air-tight seal between the shield case 3 and supporting member 20 and project the electrical leads 30 and the earth terminals 42 from the molded resin 6. The metal frame 31, which is shown by the two-dotted lines of FIG. 13A, is cut away from the electrical leads 30 and the earth terminals 42. The earth terminals 42 are soldered to a predetermined position of a circuit board to mount the acceleration detector 1 thereon and to maintain the shield case 3 at the earth level. For stably mounting the acceleration detector 1 on the circuit board, it is preferred that free ends of the earth terminals 42 are bent in a substantially L-shape so as to give stable contact of the earth terminals 42 with the circuit board, as shown in FIG. 14A, or 14B.

<Second Embodiment>

Figure 15:
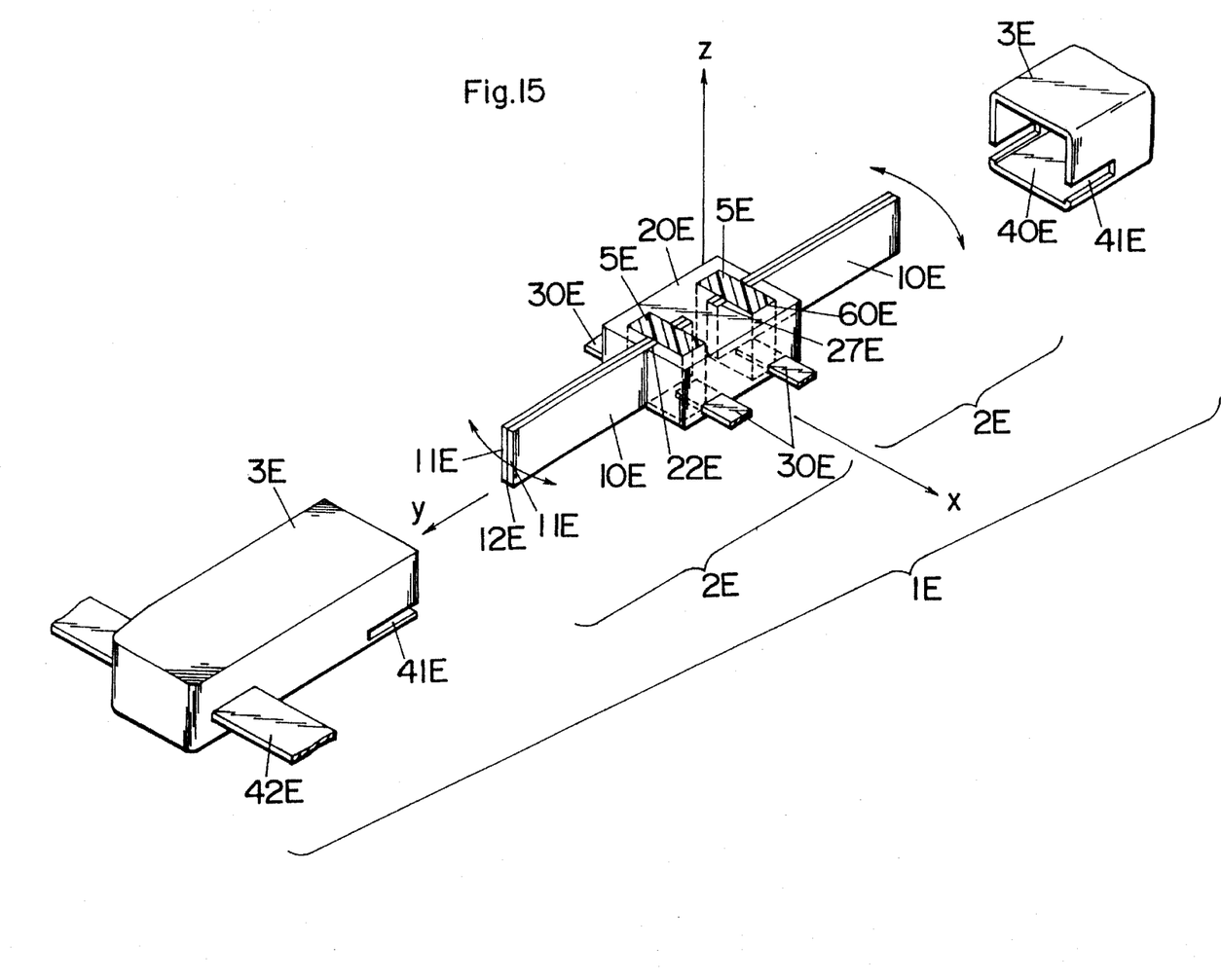
FIG. 15 is a perspective view of an acceleration detector having two piezoelectric acceleration sensor units of a second embodiment of the present invention.

An acceleration detector 1E of the second embodiment has two piezoelectric acceleration sensor units 2E. The sensor units 2E are disposed in a back to back relation so as to project piezoelectric elements 10E in the opposite directions, as shown in FIG. 15. Since each of the acceleration sensor unit 2E is identical in structure to that of the first embodiment except that the sensor units 2E have a common supporting member 20E, no duplicate explanation to common parts is deemed necessary. Like parts are designated by numerals with a suffixed letter of "E". Three mutually perpendicular axes are defined such that x and y axes are on a horizontal plane of the supporting member 20E, as shown in FIG. 15. When the acceleration detector 1E is rotated about z axis, as shown by the arrows of FIG. 15, each of the piezoelectric elements 10E receive a rotational force to thereby generate a voltage difference between rectangular sheets 11E of the piezoelectric element 10E. The acceleration applied to the acceleration detector 1E can be determined by analyzing the voltage differences obtained from the piezoelectric elements 10E.

Figure 16:
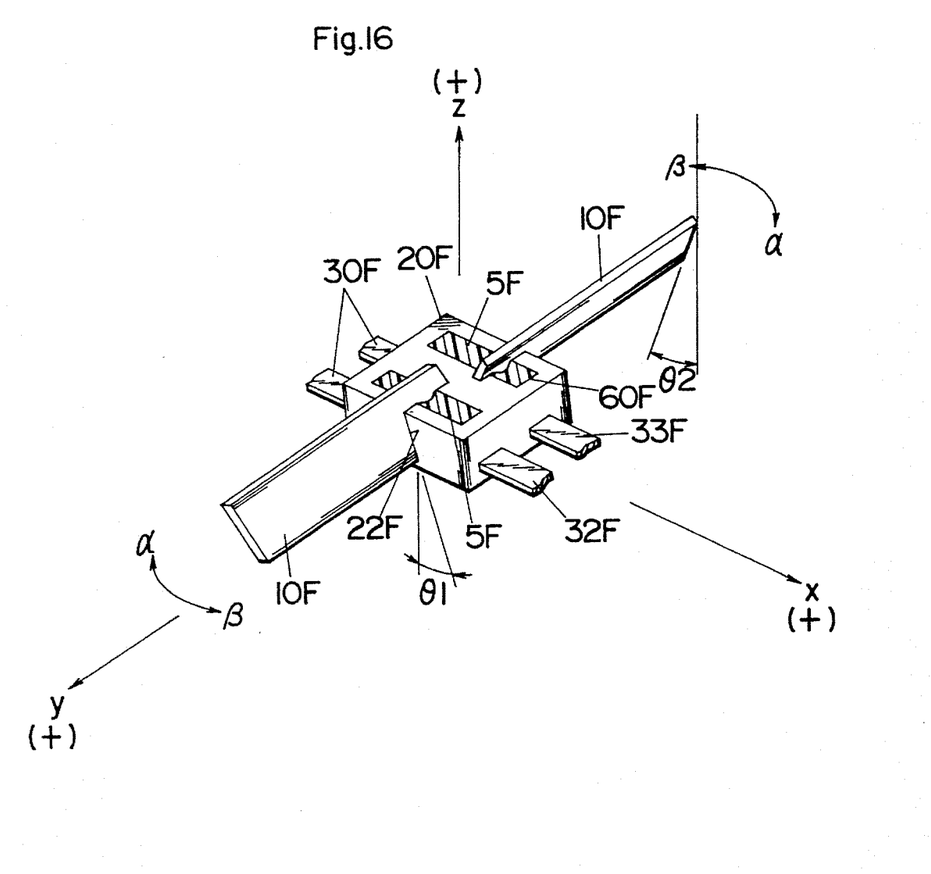
FIG. 16 is a perspective view of an acceleration detector of a first modification of the second embodiment.

As a first modification of the acceleration detector 1E of the second embodiment, it is possible to dispose the piezoelectric elements 10E at different angles to the supporting member 20E, respectively. For example, as shown in FIG. 16, piezoelectric elements 10F are attached to a supporting member 20F such that an angle $\theta 1$ between one of the piezoelectric elements 10F and z axis is +45 degrees, and an angle $\theta 2$ between the other piezoelectric element 10F and the z axis is −45 degrees. Therefore, when a pair of acceleration detecting faces are defined on opposed surfaces of the piezoelectric element 10F, the detecting faces of one of the piezoelectric elements 10F are in a perpendicular relation to those of the other piezoelectric element 10F. When the acceleration is applied to the acceleration detector of FIG. 16 in many different directions, a voltage difference V1 generated between electrical leads 30F and 32F, a voltage difference V2 generated between electrical leads 30F and 33F, and a voltage difference V3 generated between the electrical leads 32F and 33F, are listed on TABLE 1, respectively. A voltage difference between the electrical leads 30F is zero. "Vg" designates a standard voltage.

Consequently, the acceleration detector of FIG. 16 is capable of detecting the acceleration instantaneously with respect to a rotational direction, X and Z axes directions, and directions perpendicular and parallel to the acceleration detecting face of the piezoelectric element 10F.

TABLE 1

| Directions of the acceleration | V1 | V2 | V3 |
|---|---|---|---|
| rotation ($\alpha$) | $+Vg/\sqrt{2}$ | $+Vg/\sqrt{2}$ | $+\sqrt{2}\,Vg$ |
| rotation ($\beta$) | $-Vg/\sqrt{2}$ | $-Vg/\sqrt{2}$ | $-\sqrt{2}\,Vg$ |
| X axis (+) | $+Vg/\sqrt{2}$ | $-Vg/\sqrt{2}$ | 0 |
| X axis (−) | $-Vg/\sqrt{2}$ | $+Vg/\sqrt{2}$ | 0 |
| Z axis (+) | $-Vg/\sqrt{2}$ | $-Vg/\sqrt{2}$ | $-\sqrt{2}\,Vg$ |
| Z axis (−) | $+Vg/\sqrt{2}$ | $+Vg/\sqrt{2}$ | $+\sqrt{2}\,Vg$ |
| $\theta 1$ direction | 0 | $-Vg$ | $-Vg$ |
| $\theta 2$ direction | 0 | $+Vg$ | $+Vg$ |
| perpendicular to $\theta 1$ direction | $-Vg$ | 0 | $-Vg$ |
| perpendicular to $\theta 2$ direction | $+Vg$ | 0 | $+Vg$ |

As a second modification of the acceleration detector 1E of the second embodiment, it is preferred that both of two piezoelectric elements are disposed at an inclined angle to a supporting member.

| LIST OF REFERENCE NUMERALS | | | |
|---|---|---|---|
| 1 | acceleration detector | 10A | piezoelectric element |
| 2 | piezoelectric acceleration sensor unit | 20A | supporting member |
|   |   | 28A | groove |
| 3 | metallic shield case | 30A | electrical lead |
| 4 | conductive bond | 61A | side wall |
| 5 | elecrically insulating bond | 62A | bottom wall |
| 6 | electrically insulating resin | 63A | top opening |
| 10 | piezoelectric element | | |
| 11 | rectangular sheet | | |
| 12 | intermediate insulation layer | 4B | conductive bond |
|   |   | 5B | electrically insulating bond |
| 13 | electrode | 10B | piezoelectric element |
| 20 | supporting member | 20B | supporting member |
| 22 | slit | 28B | groove |
| 24 | chamfered portion | 30B | electrical lead |
| 27 | slot | 61B | side wall |
| 28 | groove | 62B | bottom wall |
| 29 | auxiliary groove | 63B | top opening |

-continued

LIST OF REFERENCE NUMERALS

| | | | |
|---|---|---|---|
| 30 | electrical lead | | |
| 31 | metal frame | | |
| 40 | aperture | 4C | conductive bond |
| 41 | notch | 5C | electrically insulating bond |
| 42 | earth terminal | 10C | piezoelectric element |
| 43 | guide portion | 20C | supporting member |
| 50 | guide member | 28C | groove |
| 51 | trench | 30C | electrical lead |
| 60 | rectangular concave | 61C | side wall |
| 61 | side wall | 62C | bottom wall |
| 62 | bottom wall | 63C | top opening |
| 63 | top opening | | |
| 64 | front wall | | |
| 65 | rear wall | 3D | metallic shield case |
| | | 40D | substantially cross-shaped aperture |
| 4A | conductive bond | 41D | notch |
| 5A | electrically insulating bond | 4D | conductive bond |
| 5D | electrically insulating bond | 22F | slit |
| 10D | piezoelectric element | 30F | electrical lead |
| 20D | supporting member | 32F | electrical lead |
| 28D | groove | 33F | electrical lead |
| 30D | electrical lead | 60F | rectangular concave |
| 60D | concave | | |
| 62D | bottom wall | | |
| 63D | top opening | 1K | shock sensor |
| 67D | first side wall | 10K | subassembly |
| 68D | second side wall | 11K | piezoelectric polymer film |
| 69D | intermediate horizontal wall | 12K | top metallized layer |
| | | 13K | lower metallized layer |
| | | 20K | supporting member |
| | | 30K | first electrical lead |
| 1E | acceleration detector | 31K | second electrical lead |
| 2E | piezoelectric acceleration sensor unit | 40K | electrically shielded case |
| | | 41K | base |
| 3E | metallic shield case | 42K | rectangular-shaped frame |
| 5E | elecrically insulating bond | 43K | metallic cover |
| 10E | piezoelectric element | | |
| 11E | rectangular sheet | | |
| 12E | intermediate insulation layer | | |
| 20E | supporting member | | |
| 22E | slit | | |
| 27E | slot | | |
| 30E | electrical lead | | |
| 40E | aperture | | |
| 41E | notch | | |
| 42E | earth terminal | | |
| 60E | rectangular concave | | |
| 5F | elecrically insulating bond | | |
| 10F | piezoelectric element | | |
| 20F | supporting member | | |

What is claimed is:

1. An acceleration detector having at least one piezoelectric acceleration sensor unit, said sensor unit comprises:

a piezoelectric element formed with a pair of elongate sheets made of a piezoelectric ceramic and an intermediate insulation layer interposed between said elongate sheets to generate a voltage difference instantaneously therebetween in response to the acceleration of said acceleration detector;

a support member made of an electrically insulating resin, said support member having a concave which is formed with side and bottom walls and a top opening, said side wall formed with a slit in which said piezoelectric element is tightly caught in such a manner as to divide said concave into two open-chambers and be supported by said support member in an cantilever fashion; and two electrical leads extending into said concave to make electrical connections between said elongate sheets and one ends of said electrical leads, the other ends of said electrical leads being projected outside of said support member through said side wall, wherein said sensor unit is enclosed in a metallic shield case, wherein said shield case has an aperture into which said support member is forced, notches formed at the circumference of said aperture for projecting said electrical leads outside of said case without contacting with said case, and earth terminal means projecting from an outer surface of said case to maintain said case at the earth level.

2. An acceleration detector as set forth in claim 1, wherein said shield case enclosing said sensor unit therein is molded with a resin so as to provide an air-tight seal between said supporting member and said shield case, while projecting said electrical leads and said earth terminal means from said molded resin.

3. An acceleration detector as set forth in claim 1, wherein said electrical leads are integrally molded with said supporting member.

4. An acceleration detector as set forth in claim 1, wherein said elongate sheets are electrically connected to said electrical leads with the use of a conductive bond.

5. An acceleration detector having at least one piezoelectric acceleration sensor unit, said sensor unit comprises:

a piezoelectric element formed with a pair of elongate sheets made of a piezoelectric ceramic and an intermediate insulation layer interposed between said elongate sheets to generate a voltage difference instantaneously therebetween in response to the acceleration of said acceleration detector;

a support member made of an electrically insulating resin, said support member having a concave which is formed with side and bottom walls and a top opening, said side wall formed with a slit in which said piezoelectric element is tightly caught in such a manner as to divide said concave into two open-chambers and be supported by said support member in an cantilever fashion; and two electrical leads extending into said concave to make electrical connections between said elongate sheets and one ends of said electrical leads, the other ends of said electrical leads being projected outside of said support member through said side wall, wherein said elongate sheets are electrically connect tot said electrical leads with the use of a conductive bond, wherein an electrically insulating bond having a stronger bonding strength than said conductive bond is filled within said concave to tightly fix one end of said piezoelectric element to said supporting member.

6. An acceleration detector having at least one piezoelectric acceleration sensor unit, said sensor unit comprises:

a piezoelectric element formed with a pair of elongate sheets made of a piezoelectric ceramic and an intermediate insulation layer interposed between said elongate sheets to generate a voltage difference instantaneously therebetween in response to the acceleration of said acceleration detector;

a support member made of an electrically insulating resin, said support member having a concave which is formed with side and bottom walls and a top opening, said side wall formed with a slit in which said piezoelectric element is tightly caught in such a manner as to divide said concave into two open-chambers and be supported by said support member in an cantilever fashion; and two electrical leads extending into said concave to make electrical connections between said elongate sheets and one ends of said electrical leads, the other ends of said electrical leads being projected outside of said support member through said side wall, wherein said elongate sheets are electrically connect tot said electrical leads with the use of a conductive bond, wherein a primary groove is formed in said bottom and side walls to extend over the full length of a contact face of said piezoelectric element with said bottom and side walls along said intermediate insulation layer of said piezoelectric element.

7. An acceleration detector as set forth in claim 6, wherein an auxiliary groove perpendicular to said primary groove is formed in said bottom wall to extend between said electrical leads.

8. An acceleration detector as set froth in claim 1, wherein a slot is formed in said side wall opposed to said slit to fit one end of said piezoelectric element thereto.

9. An acceleration detector as set forth in claim 1, wherein said side wall extends from said bottom wall in such a stepwise manner that an area of said bottom wall is smaller than that of said top opening.

10. An acceleration detector as set forth in claim 1, wherein said side wall is inclined such that an area of said bottom wall is smaller than that of said top opening.

11. An acceleration detector as set forth in claim 1, wherein said piezoelectric element is disposed at a right angle to said supporting member.

12. An acceleration detector as set forth in claim 1, wherein said acceleration detector has two said sensor units.

13. An acceleration detector as set forth in claim 12, wherein said sensor units are disposed in a back to back relation so as to project said piezoelectric elements in the opposite directions.

14. An acceleration detector as set forth in claim 13, wherein said supporting members of said sensor units are integrally molded together.

15. An acceleration detector having at least one piezoelectric acceleration sensor unit, said sensor unit comprises:

a piezoelectric element formed with a pair of elongate sheets made of a piezoelectric ceramic and an intermediate insulation layer interposed between said elongate sheets to generate a voltage difference instantaneously therebetween in response to the acceleration of said acceleration detector;

a support member made of an electrically insulating resin, said support member having a concave which is formed with side and bottom walls and a top opening, said side wall formed with a slit in which said piezoelectric element is tightly caught in such a manner as to divide said concave into two open-chambers and be supported by said support member in an cantilever fashion; and two electrical leads extending into said concave to make electrical connections between said elongate sheets and one ends of said electrical leads, the other ends of said electrical leads being projected outside of said support member through said side wall, wherein said acceleration detector has two said sensor units, wherein said sensor units are disposed in a back to back relation so as to project said piezoelectric elements in the opposite directions, wherein said piezoelectric elements are disposed at different angles to said supporting members of said sensor units, respectively.

\* \* \* \* \*